(12) United States Patent
Griffiths et al.

(10) Patent No.: US 12,335,228 B2
(45) Date of Patent: Jun. 17, 2025

(54) AUTOMATIC DEVICE ORDERING

(71) Applicant: Rockwell Automation Technologies, Inc., Mayfield Heights, OH (US)

(72) Inventors: Scott T. Griffiths, Milwaukee, WI (US); Wojciech Koczwara, Katowice (PL); David D. Brandt, Milwaukee, WI (US); Marek Mossakowski, Katowice (PL); Yutao Wang, Milwaukee, WI (US); Kyle Crum, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 399 days.

(21) Appl. No.: 18/160,517

(22) Filed: Jan. 27, 2023

(65) Prior Publication Data
US 2023/0168357 A1 Jun. 1, 2023

Related U.S. Application Data

(63) Continuation of application No. 16/985,423, filed on Aug. 5, 2020, now abandoned.

(51) Int. Cl.
*H04L 12/40* (2006.01)
*G01S 13/12* (2006.01)
*G01S 13/28* (2006.01)
*H04L 61/5038* (2022.01)

(52) U.S. Cl.
CPC ......... *H04L 61/5038* (2022.05); *G01S 13/12* (2013.01); *G01S 13/28* (2013.01); *H04L 12/40097* (2013.01); *H04L 12/40123* (2013.01)

(58) Field of Classification Search
CPC ... G01S 13/28; G01S 13/12; H04L 12/40097; H04L 12/40123; H04L 2101/622; H04L 61/5038
See application file for complete search history.

(56) References Cited

U.S. PATENT DOCUMENTS

| 3,733,602 | A | 5/1973 | Cuckler et al. |
| 6,542,946 | B1 | 4/2003 | Wooten |
| 7,486,104 | B2 | 2/2009 | Oh et al. |
| 8,705,548 | B2 * | 4/2014 | Meyer-Grafe ........ H04L 12/403 370/257 |

(Continued)

FOREIGN PATENT DOCUMENTS

| EP | 3 419 225 A1 | 12/2018 |
| WO | WO-0228061 A1 * | 4/2002 ......... H04L 12/2697 |

(Continued)

OTHER PUBLICATIONS

"IEEE 802.3 SPMD 10SPE Multidrop Enhancements Study Group Objectives for the Elevator/Escalator and Automotive Segments Topology Discovery (Ranging)", IEEE Draft, Jan. 21, 2020, XP068168656.

(Continued)

*Primary Examiner* — Mounir Moutaouakil
(74) *Attorney, Agent, or Firm* — Foley & Lardner LLP

(57) ABSTRACT

For automatic device addressing, a processor configures each node device on a serial network for an order measurement. The processor further measures an order parameter for each of the node devices. The processor determines an order number of each of the node devices based on the order parameter for the node device.

20 Claims, 13 Drawing Sheets

(56) References Cited

U.S. PATENT DOCUMENTS

| | | | |
|---|---|---|---|
| 9,934,191 B2 | 4/2018 | Peting et al. | |
| 9,960,981 B2 * | 5/2018 | Takahashi | H04L 1/0041 |
| 2005/0134307 A1 | 6/2005 | Stojanovic et al. | |
| 2012/0275345 A1 * | 11/2012 | Yang | H04W 8/26 |
| | | | 370/255 |
| 2013/0237228 A1 | 9/2013 | Womack et al. | |
| 2015/0000973 A1 | 1/2015 | Stephens, Jr. | |
| 2015/0097468 A1 | 4/2015 | Hajati et al. | |
| 2015/0244370 A1 | 8/2015 | Shaeffer | |
| 2016/0034414 A1 | 2/2016 | Peting et al. | |
| 2017/0078081 A1 | 3/2017 | Banu | |
| 2018/0321380 A1 | 11/2018 | Barker et al. | |
| 2018/0375738 A1 | 12/2018 | van der Wel et al. | |
| 2020/0292653 A1 * | 9/2020 | Said | G01R 29/0842 |
| 2020/0300983 A1 * | 9/2020 | Morarity | G01S 7/4865 |
| 2021/0063562 A1 * | 3/2021 | Leong | G01S 13/76 |
| 2021/0320683 A1 | 10/2021 | Seong et al. | |
| 2022/0043135 A1 * | 2/2022 | Griffiths | H04L 12/40097 |

FOREIGN PATENT DOCUMENTS

| | | | | |
|---|---|---|---|---|
| WO | WO-2019/166503 A2 | 9/2019 | | |
| WO | WO-2020088968 A1 * | 5/2020 | | H04L 12/40013 |
| WO | WO-2021032254 A1 * | 2/2021 | | G06F 13/42 |

OTHER PUBLICATIONS

EP Search Report for EP Application No. 21185483.1, dated Jan. 24, 2024, pp. 1-5.

* cited by examiner

AUTOMATIC DEVICE ORDERING

CROSS-REFERENCE TO RELATED APPLICATIONS

This is a continuation application of and claims priority to U.S. patent application Ser. No. 16/985,423 entitled "AUTOMATIC DEVICE ORDERING" and filed on Aug. 5, 2020 for Scott T. Griffiths, which is incorporated herein by reference.

BACKGROUND INFORMATION

The subject matter disclosed herein relates to automatic device ordering.

BRIEF DESCRIPTION

An apparatus for automatic device ordering is disclosed. The apparatus includes a processor and a memory storing code executable by the processor. The processor configures each node device on a serial network for an order measurement. The processor further measures an order parameter for each of the node devices. The processor determines an order number of each of the node devices based on the order parameter for the node device.

A method for automatic device ordering is also disclosed. The method configures, by use of a processor, each node device on a serial network for an order measurement. The method measures an order parameter for each of the node devices. The method determines an order number of each of the node devices based on the order parameter for the node device.

A computer program product for automatic device ordering is also disclosed. The computer program product comprises a non-transitory computer readable storage medium having code embodied therein. The code is readable/executable by a processor. The processor configures each node device on a serial network for an order measurement. The processor further measures an order parameter for each of the node devices. The processor determines an order number of each of the node devices based on the order parameter for the node device.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
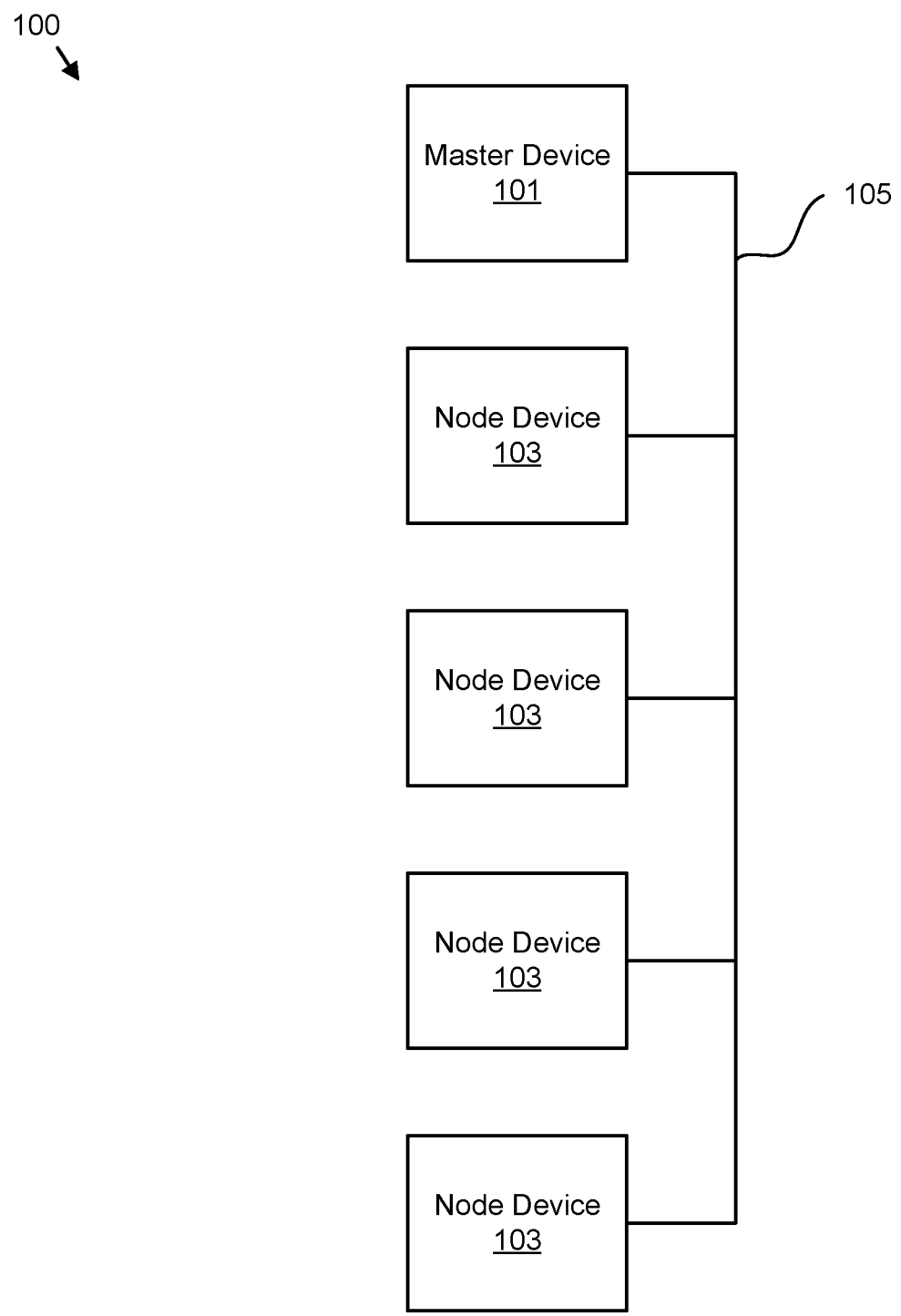
FIG. 1A is a schematic block diagram of serial network according to an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wireline, optical fiber, Radio Frequency (RF), or the like, or any suitable combination of the foregoing.

In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Python, Ruby, R, Java, Java Script, Smalltalk, C++, C sharp, Lisp, Clojure, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program product may be shared, simultaneously serving multiple customers in a flexible, automated fashion.

The computer program product may be integrated into a client, server and network environment by providing for the computer program product to coexist with applications, operating systems and network operating systems software and then installing the computer program product on the clients and servers in the environment where the computer program product will function. In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

FIG. 1A is a schematic block diagram of a serial network 100. The serial network 100 provides communications between the plurality of devices. In the depicted embodiment, the serial network 100 includes a master device 101, a plurality of node devices 103, and a network cable 105. The master device 101 may communicate with and/or control the plurality of node devices 103. In addition, the master device 101 may communicate with networks and/or devices outside of the serial network 100. For example, the master device 101 may communicate with the local area network. The node devices 103 may communicate with networks and/or devices through the master device 101.

The network cable 105 functions as a multi-drop bus. Node devices 103 may be added to the network cable 105 as needed. For example, a switch node device 103 may be added to an automation system by physically installing the switch node device 103 at the automation system and connecting the switch node device 103 to the network cable 105. The master device 101 may discover the switch node device 103 and communicate with the switch node device 103. As a result, inputs to the switch node device 103 are communicated to the master device 101 and/or upstream networks and/or devices outside of the serial network 100. Thus, the serial network 100 supports the convenient addition of node devices 103.

The master device 101 and node devices 103 may each have a node device identifier. In one embodiment, the node device identifier is a Media Access Control (MAC) address. The node device identifier is used to logically identify and address a corresponding node device 103. In addition, it is often desirable to physically identify the place of a node device 103 on the network cable 105. For example, a user may need to physically identify a node device 103 as a third node device 103 on the network cable 105 in order to service the node device 103. The place of the node device 103 on the network cable 105 may be indicated using a device address. In one embodiment, a serial network unique but non-sequential device address is assigned for each location.

Figure 1B:
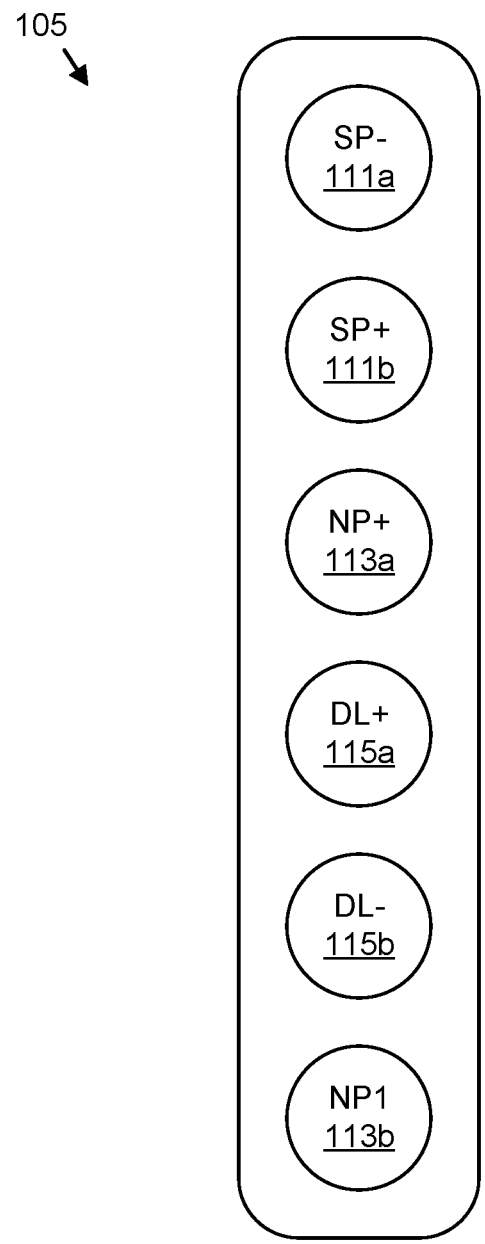
FIG. 1B is a schematic drawing of a network cable according to an embodiment.

FIG. 1B is a schematic drawing of the network cable 105. In the depicted embodiment, the network cable 105 is a ribbon cable. The network cable includes switched power lines 111, network power lines 113, and data lines 115. The switched power lines 111 may provide unregulated power suitable for use with components such as contactors. The network power lines 113 may provide regulated power for communications. The data lines 115 may carry communications and/or data between the node devices 103 and the master device 101. In one embodiment, the data lines 115 are single pair Ethernet wires.

In the past, network cables 105 for serial networks 100 included a select line. The select line supported the identification of node devices 103 on network cables 105. The select line was used to determine an order of the node devices 103 on the network cable 105. Unfortunately, the addition of select lines increased the cost of the serial network 100. The embodiments described herein determine the order of node devices 103 on the network cable 105 without a select line. The order of the node devices 103 may be used to assign serial network unique and/or sequential device addresses to the node devices 103 as will be described hereafter. As a result, the order of the node devices 103 may be determined and serial network unique and/or sequential device addresses may be assigned without a select line in the network cable 105. Thus, the cost of the serial network 100 is reduced.

Figure 2:
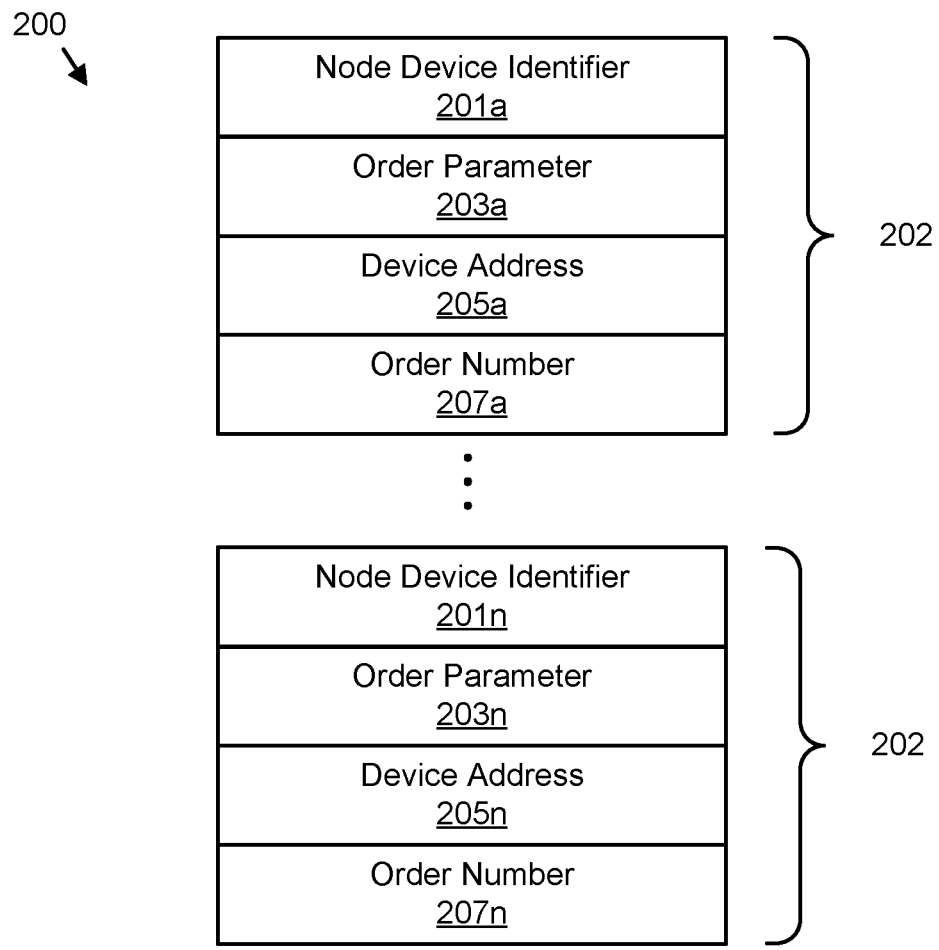
FIG. 2 is a schematic block diagram of network data according to an embodiment.

FIG. 2 is a schematic block diagram of network data 200. The network data 200 may be used to determine the order of node devices 103 on the network cable 105 and to assign device addresses 205 to the node devices 103. The network data 200 may be organized as a data structure in a memory. In the depicted embodiment, the network data 200 includes an entry 202 for each node device 103. Each entry 202 may include the node device identifier 201, an order parameter 203, the device address 205, and an order number 207.

The node device identifier 201 may be a MAC address, a serial number, a custom identifier, and the like. Each node device identifier 201 may be unique. The node device identifier 201 may be used to address the corresponding node device 103.

The order parameter 203 may be measured by the master device 101 in order to determine the order of the corresponding node device 103 on the network cable 105. In one embodiment, the order parameter 203 is a node voltage that is measured at the node device 103. For example, the order parameter 203 may be a node voltage of a data line 115 measured at the node device 103. In an alternative embodiment, the order parameter 203 may be a time-of-flight for a pulse that is transmitted on the data line 115 by the master device 101, returned as an answering pulse that is reflected by one and only one node device 103 or generated by one and only one node device 103, and received back at the master device 101.

The order number 207 may indicate the place of the node device 103 on the network cable 105. Table 1 illustrates one embodiment of order numbers 207.

TABLE 1

| Device 101/103 | Order Number 207 |
| --- | --- |
| Master Device 101 | 0 |
| First Node Device 103 | 1 |
| Second Node Device 103 | 2 |
| Third Node Device 103 | 3 |
| Fourth Node Device 103 | 4 |

The device address 205 may indicate the physical place of the node device 103 on the network cable 105. In one embodiment, the device address 205 is an Internet Protocol (IP) address. The IP address may be serial network unique. The IP address may be assigned sequentially beginning with the master device 101. Table 2 illustrates one embodiment of sequential IP address assignment.

TABLE 2

| Device 101/103 | Device Address 205 |
| --- | --- |
| Master Device 101 | 192.168.1.0 |
| First Node Device 103 | 192.168.1.1 |
| Second Node Device 103 | 192.168.1.2 |

TABLE 2-continued

| Device 101/103 | Device Address 205 |
| --- | --- |
| Third Node Device 103 | 192.168.1.3 |
| Fourth Node Device 103 | 192.168.1.4 |

Figure 3A:
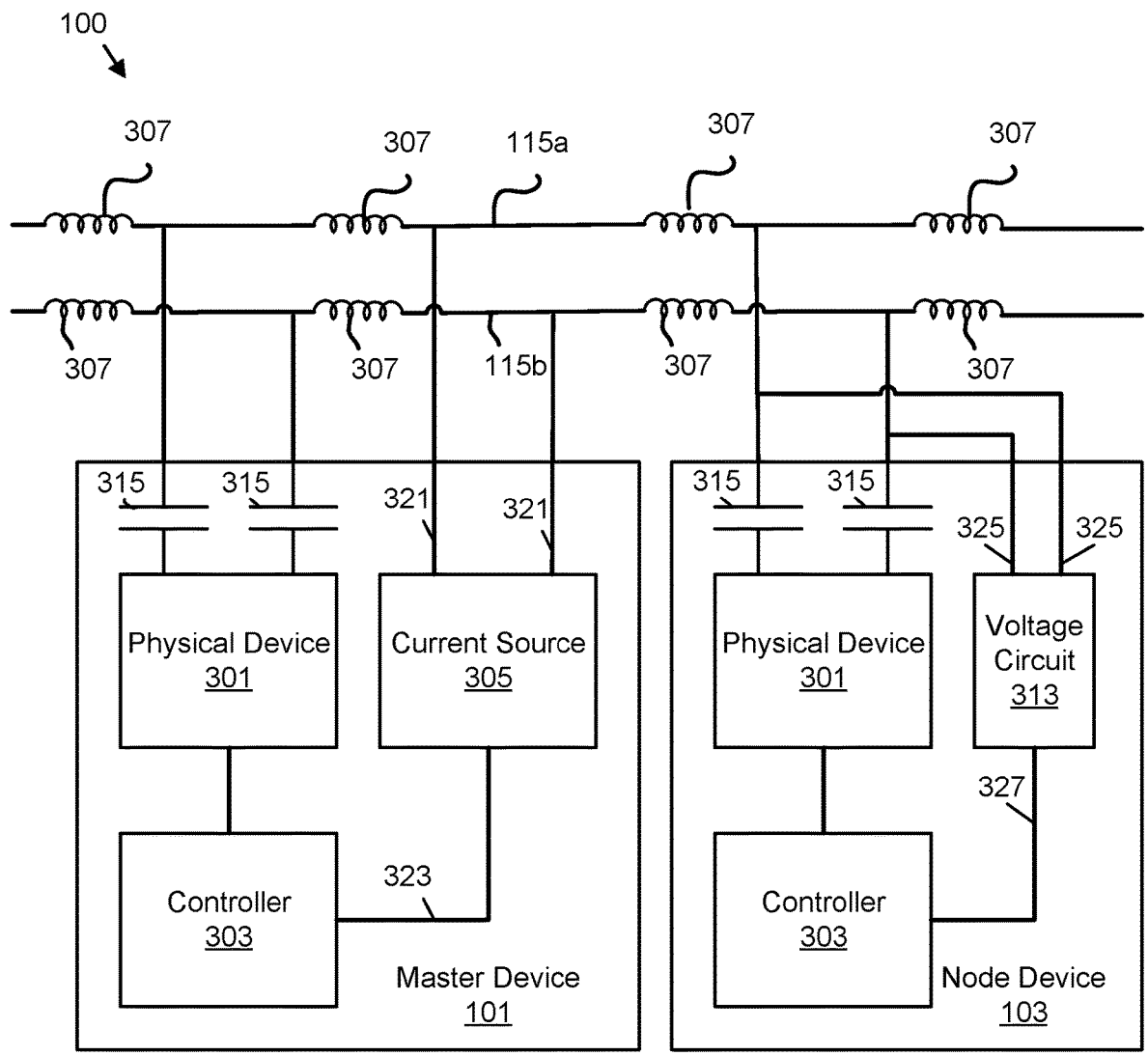
FIG. 3A is a schematic drawing of a master device and a node device on the serial network according to an embodiment.

FIG. 3A is a schematic drawing of a master device 101 and a node device 103 on the serial network 100. In the depicted embodiment, the data lines 115 are shown. The master device 101 and one representative node device 103 are connected to the data lines 115. In one embodiment, the master device 101 and the node device 103 each comprise a physical device 301 and/or a controller 303. The physical device 301 may be a switch, a control, a display, an indicator, an actuator, and the like. The physical device 301 may be connected to the data lines 115 via capacitors 315. The controller 303 may manage the corresponding master device 101 or node device 103. The physical device 301 and controller 303 may be configured based on the functions performed by the corresponding master device 101 and/or node device 103.

In the depicted embodiment, the master device 101 includes a current source 305. The current source 305 may apply a current to the data lines 115 via current connections 321. In a certain embodiment, the current source 305 applies the current at a specified voltage. The current source 305 may apply the current in response to a current command 323 from the controller 303. The current command 323 may be an analog signal or a digital command.

In addition, at least node device 103 may include a voltage circuit 313 as shown. The voltage circuit 313 may measure voltage between the data lines 115 at data line connections 325. The voltage circuit 313 may communicate the voltage to the controller 303 via a voltage signal 327. The voltage signal 327 may be a digital value. Alternatively, the voltage signal 327 may be an analog value that is converted to a digital value by an analog to digital converter at the controller 303. The controller 303 may communicate the digital value of the voltage as the order parameter 203 from the node device 103 to the master device 101. In addition, the controller 303 may communicate the node device identifier 201 with the order parameter 203 to the master device 101.

In one embodiment, the data lines 115 between the master device 101 and/or each node device 103 comprise at least one node component 307. Each node component 307 may present a constant Direct Current (DC) resistance in series with the data lines 115 of the serial network 100. In the depicted embodiment, the node component 307 is an inductor. The node component 307 may also be a resistor and/or a resistor/inductor combination. The node component 307 may have an inductance in the range of 20 to 80 nanohenries (nH).

The node component 307 may be disposed inside a connector of the network cable 105. As a result, as the current source 305 applies the current to the data lines 115, each node device 103 has a distinct voltage that is measured by the voltage circuit 313. Thus, each node device 103 reports a distinct, unique voltage to the master device 101, enabling the node voltage to identify the order of node devices 103 on the network cable 105. The current return path is not depicted, but may be through an end of line termination.

Figure 3B:
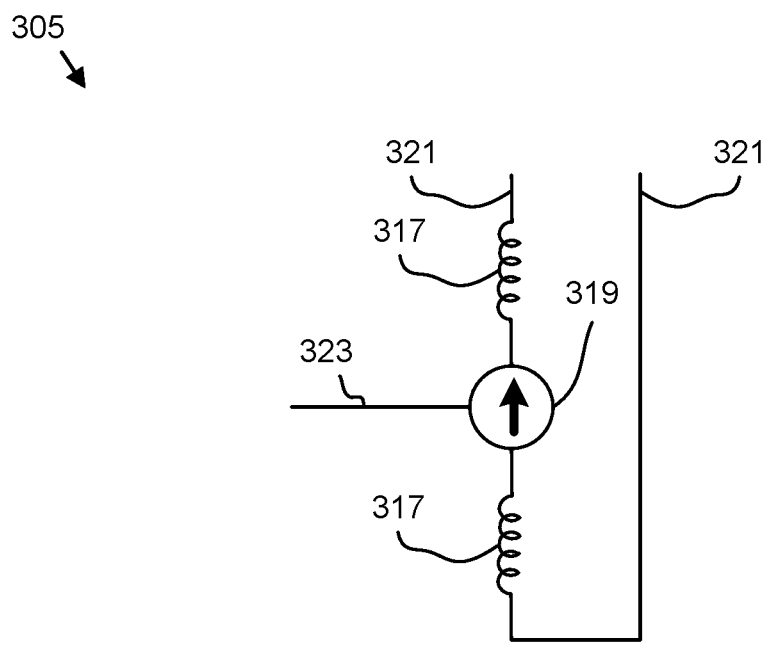
FIG. 3B is a schematic drawing of a current source according to an embodiment.

FIG. 3B is a schematic drawing of one embodiment of the current source 305 of FIG. 3A. In the depicted embodiment, the current command 323 turns a current generator 319 on and off. The current generator 319 applies the current to the data lines 115 via the current connections 321. In one embodiment, one or more current inductors 317 are in series with the current generator 319. The current inductors 317 may have a constant DC resistance. As a result, the current source 305 may supply a voltage between the current connections 321.

Figure 3C:
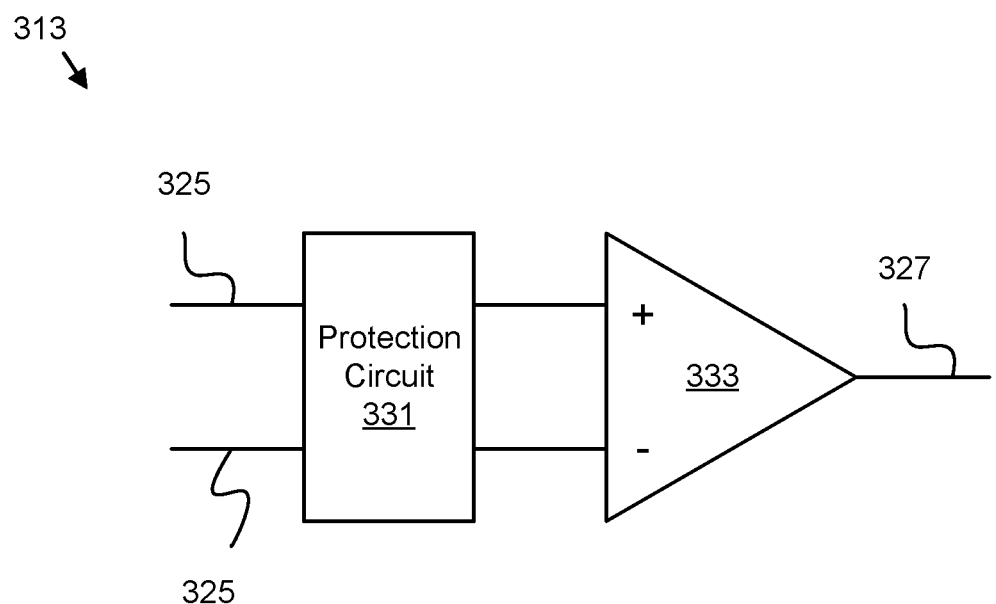
FIG. 3C is a schematic drawing of a voltage circuit according to an embodiment.

FIG. 3C is a schematic drawing of one embodiment of the voltage circuit 313 of FIG. 3A. In the depicted embodiment, the data line connections 325 are buffered by a protection circuit 331. An operational amplifier (op amp) 333 may measure the voltage at the data lines 115 and communicate the voltage signal 327 to the controller 303 of the node device 103. An analog to digital converter at the controller 303 may convert the voltage signal 327 to a digital node voltage.

Figure 3D:
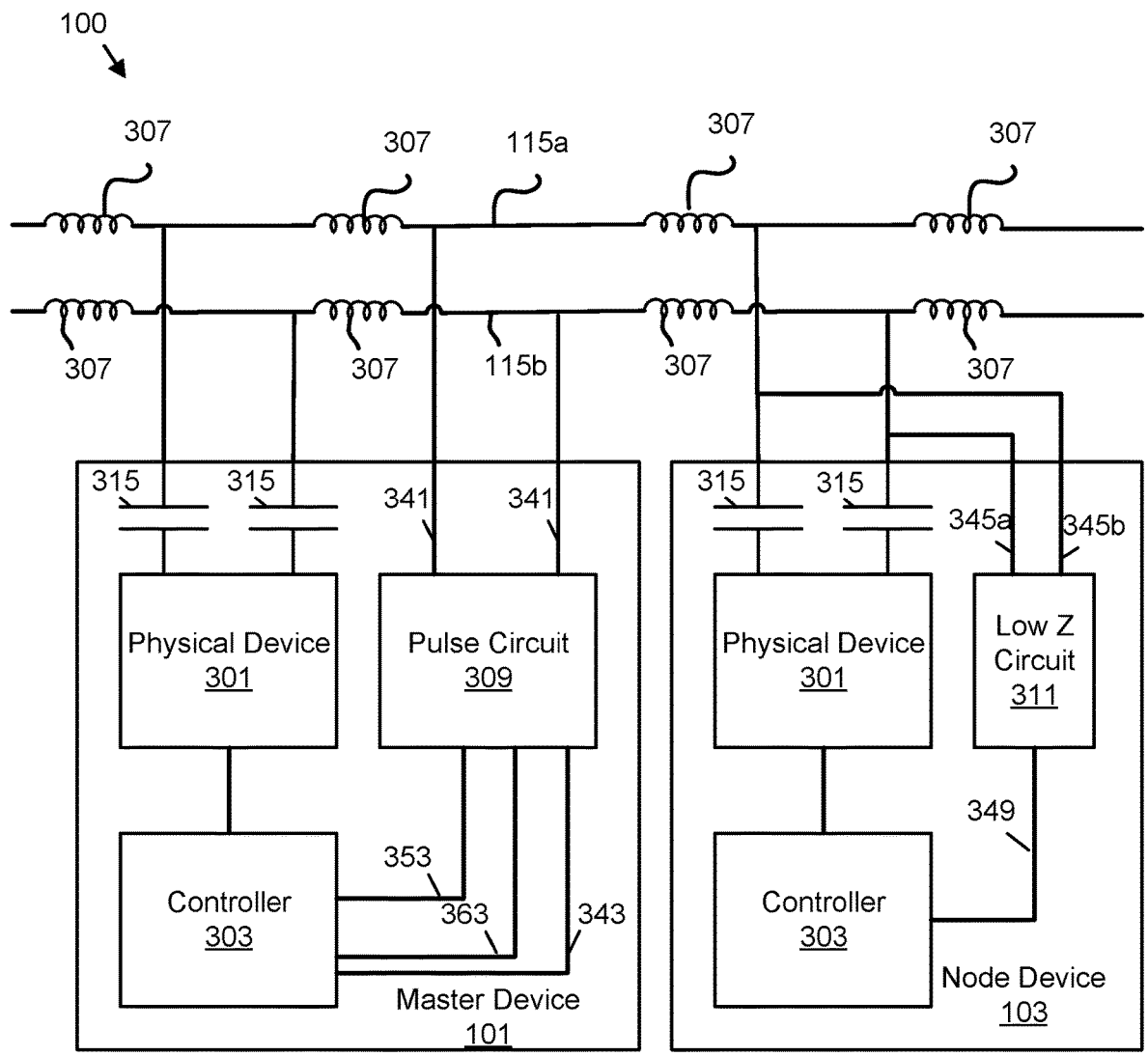
FIG. 3D is a schematic drawing of a master device and a node device on the serial network according to an alternate embodiment.

FIG. 3D is a schematic drawing of the master device 101 and the node device 103 on the serial network 100. The master device 101 and the node device 103 are shown connected to the data lines 115 of the network cable 105. The physical device 301 is connected to the data lines 115 via capacitors 315.

In the depicted embodiment, the node device 103 includes a low impedance circuit 311. The low impedance circuit 311 is connected to the data lines 115 via impedance connections 345a-b. In response to a low impedance command 349 from the controller 303, the low impedance circuit 311 may generate a low impedance such as the short across the data lines 115.

In the depicted embodiment, the master device 101 includes a pulse circuit 309 that is connected to the data lines 115 via a pulse connection 341. The pulse circuit 309 may generate a pulse in response to a pulse command 353. The pulse circuit 309 may further detect an answering pulse that is a reflection of the pulse at the pulse connection 341 using a voltage threshold 343 as will be described hereafter. The pulse circuit 309 may measure a time-of-flight 363 of the pulse as a time interval from the generation of the pulse to the detection of the answering pulse. The pulse circuit 309 may communicate the time-of-flight 363 as the order parameter 203 to the controller 303.

In one embodiment, the data lines 115 between the master device 101 and/or each node device 103 comprise at least one node component 307. Each node component 307 may present a constant DC resistance in series with the data lines 115 of the serial network 100. In the depicted embodiment, the node component 307 is an inductor. The node component 307 may also be a resistor and/or a resistor/inductor combination. The node component 307 may have an inductance in the range of 20 to 80 nanohenries (nH). The node component 307 may increase the time-of-flight 363 measured between the node devices 103, increasing the differences between the order parameters 203.

Figure 3E:
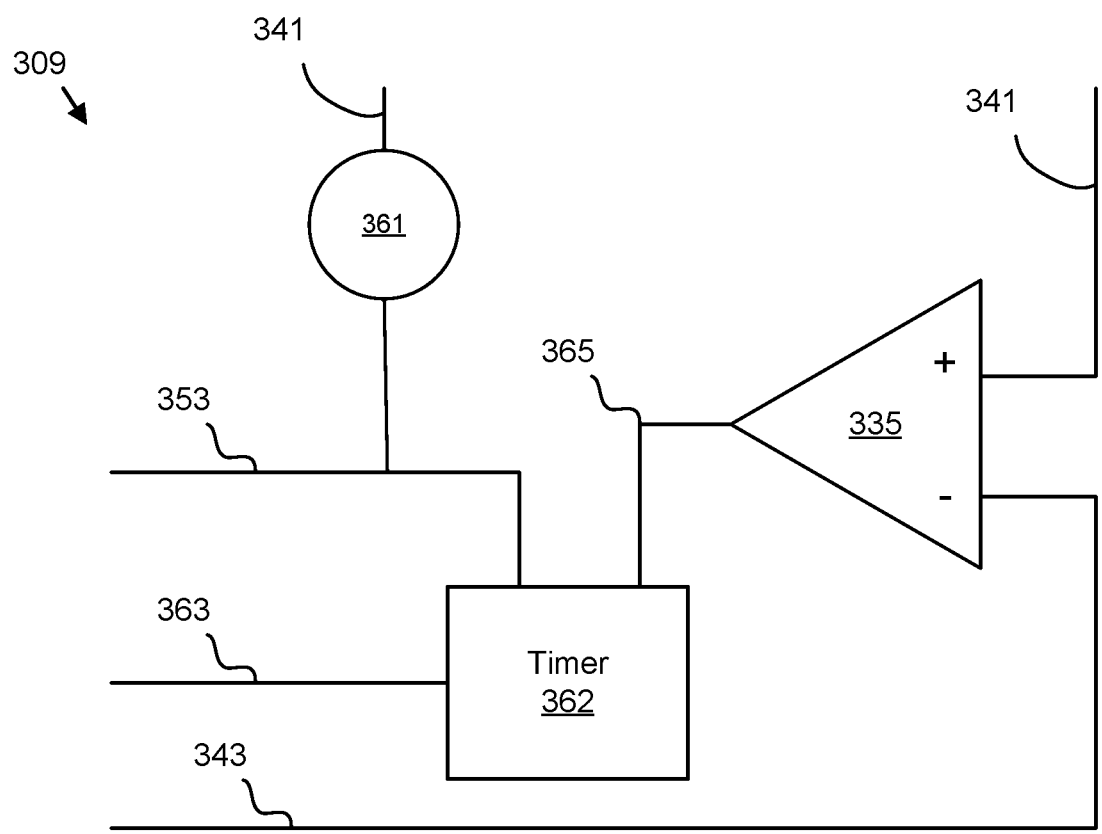
FIG. 3E is a schematic drawing of a pulse circuit according to an embodiment.

FIG. 3E is a schematic drawing of the pulse circuit 309. The pulse circuit 309 includes a pulse generator 361 that generates the pulse on a data line 115 via the pulse connection 341. The pulse command 353 initiates generation of the pulse and starts a timer 362. An op amp 335 compares the voltage of the data line 115 to the voltage threshold 343. If the voltage of the data line 115 exceeds the voltage threshold 343 a stop command 365 is generated by the op amp 335 that stops the timer 362. The voltage threshold 343 may be in the range of 0.5 to 1.5 volts. The time interval from the start of the timer 362 to stopping the timer 362 is the time-of-flight 363 of the pulse.

Figure 3F:
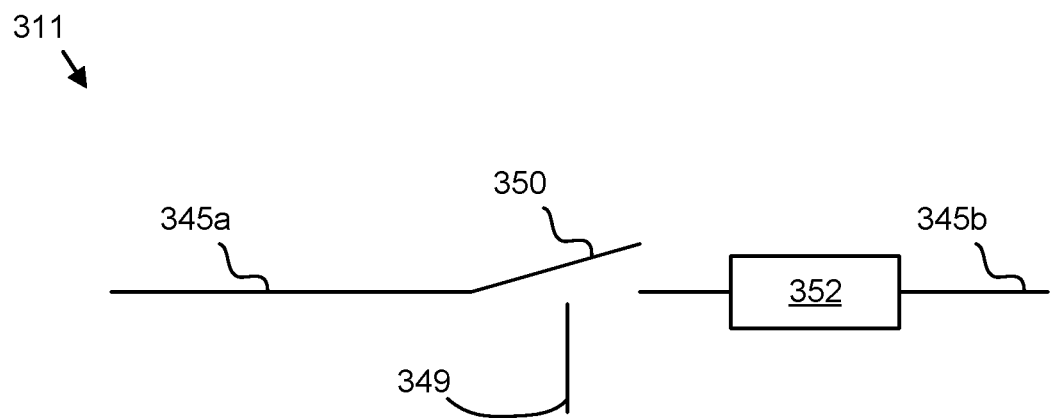
FIG. 3F is a schematic drawing of a low impedance circuit according to an embodiment.

FIG. 3F is a schematic drawing of the low impedance circuit 311 of FIG. 3D. In the depicted embodiment, the low impedance command 349 closes a switch 350 that shorts the impedance connections 345a-b. In one embodiment, a low impedance component 352 is in series with the switch 350. The low impedance component 352 may have a resistance of less than 50 ohms.

Figure 3G:
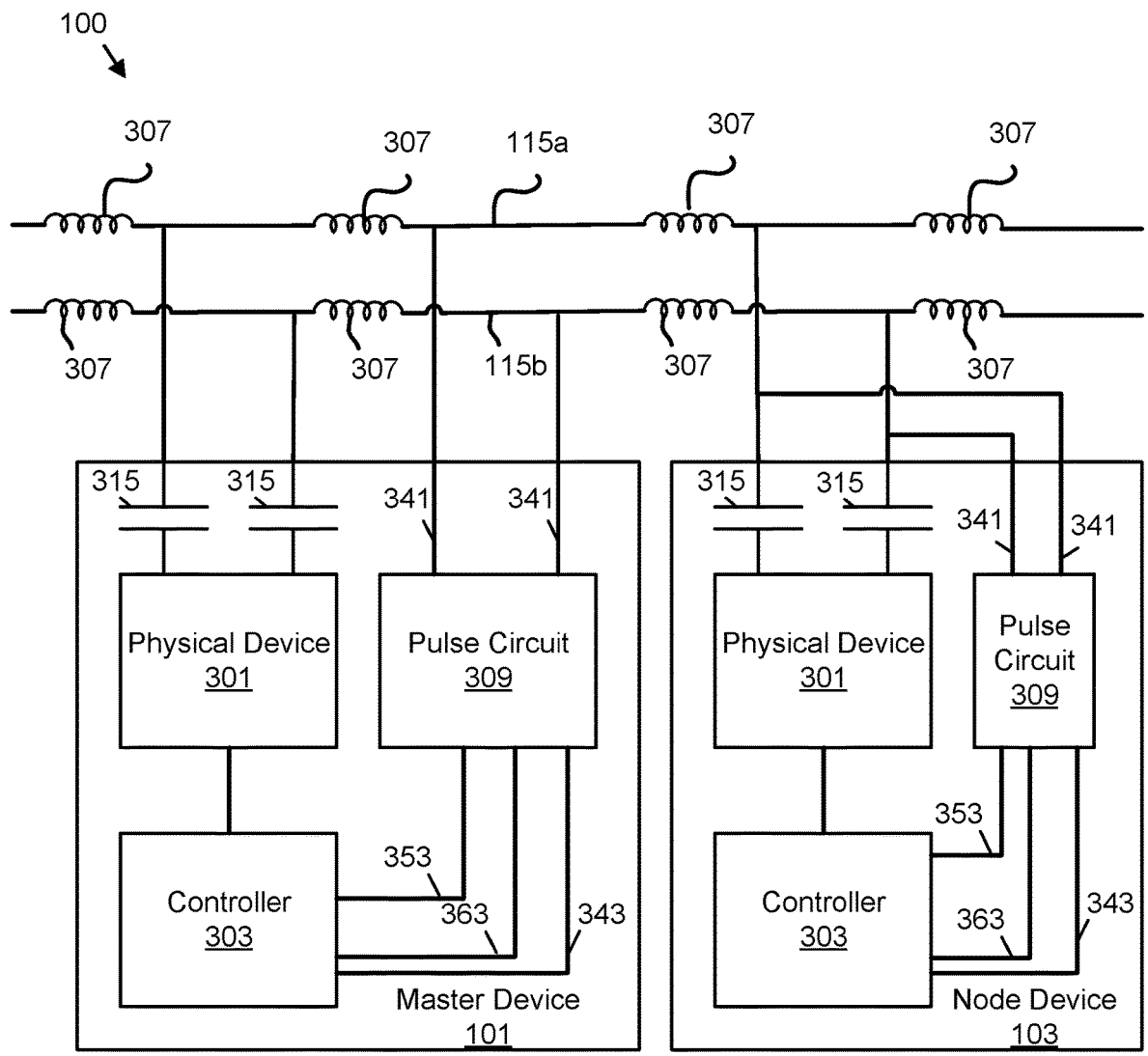
FIG. 3G is a schematic drawing of a master device and a node device on the serial network according to an alternate embodiment.

FIG. 3G is a schematic drawing of a master device 101 and a node device 103 on the serial network according 100. The node device 103 includes the pulse circuit 309. In the depicted embodiment, the pulse circuit 309 of the node device 103 detects the pulse 361a generated by the pulse circuit 309 of the master device 101. In response to the node device 103 detecting the pulse 361a, the controller 303 of the node device 103 directs the pulse circuit 309 of the node device 103 to generate a response pulse as the answering pulse 361b. The pulse circuit 309 of the master device 101 receives the answering pulse 361b.

Figure 3H:
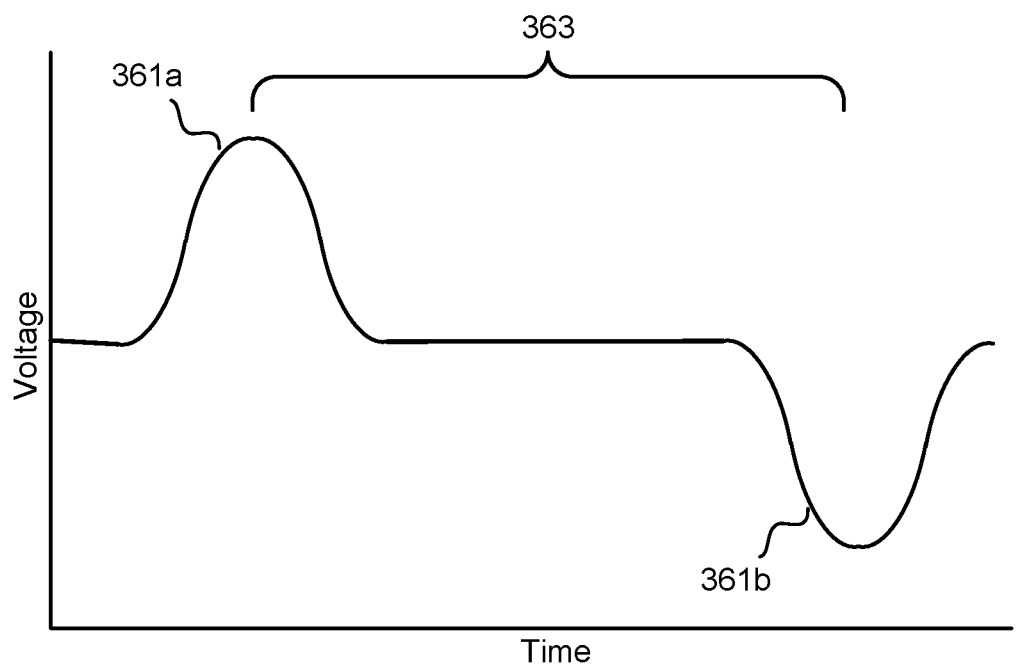
FIG. 3H is a schematic drawing of pulses according to an embodiment.

FIG. 3H is a schematic drawing of the pulses 361a/b of FIGS. 3D and 3G. In the depicted embodiment, the pulse circuit 309 of the master device 101 generates a pulse 361a that travels over the data line 115. When the pulse 361a reaches the low impedance circuit 311 of FIG. 3D, an answering pulse 361b that is a reflection of the pulse 361b is generated that returns to the pulse circuit 309 of the master device 101. Alternatively, when the pulse 361a reaches the pulse circuit 309 of the node device 103 of FIG. 3G, an answering pulse 361b that is a response pulse generated by the pulse circuit 309 of the node device 103 is communicated to the pulse circuit 309 of the master device 101. The time interval between generating the pulse 361a at the pulse circuit 309 and receiving the answering pulse 361b at the pulse circuit 309 of the master device 101 is the time-of-flight 363.

Figure 4:
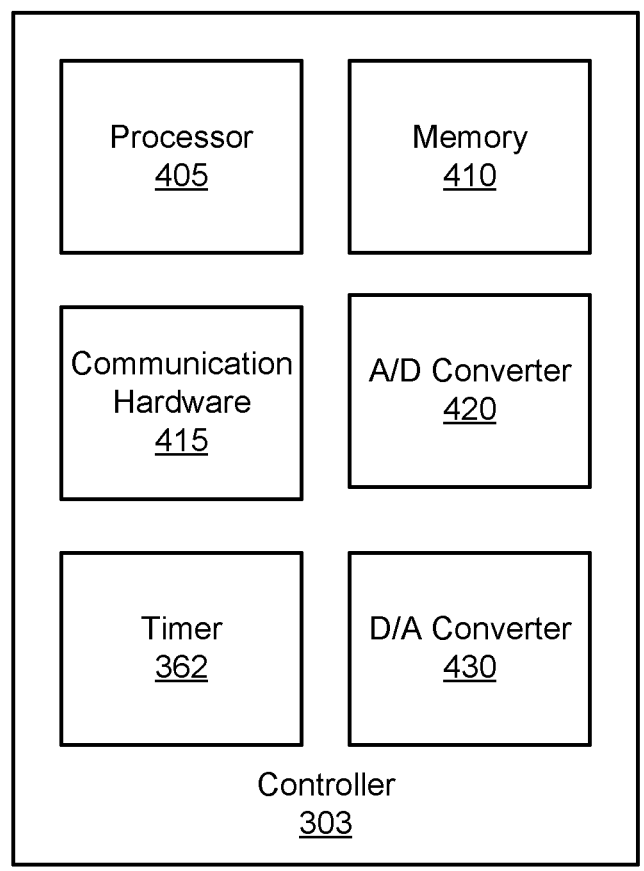
FIG. 4 is a schematic block diagram of a controller according to an embodiment.

FIG. 4 is a schematic block diagram of the controller 303. In the depicted embodiment, the controller 303 includes a processor 405, a memory 410, and communication hardware 415. The memory 410 may be a semiconductor storage device, a hard disk drive, or combinations thereof. The memory 410 stores code. The processor 405 executes the code. The communication hardware 415 may communicate with other devices. For example, the communication hardware 415 may communicate with the physical device 301. In addition, the communication hardware 415 may communicate with the data lines 115. In a certain embodiment, the communication hardware 415 communicates with a network such as an Ethernet network.

In one embodiment, the controller 303 includes the timer 362. In addition, the controller 303 may include an analog to digital converter 420 and/or a digital to analog converter 430. The analog-to-digital converter 420 may convert the voltage signal 327 to a digital value. The digital to analog converter 430 may generate the voltage threshold 343.

Figure 5A:
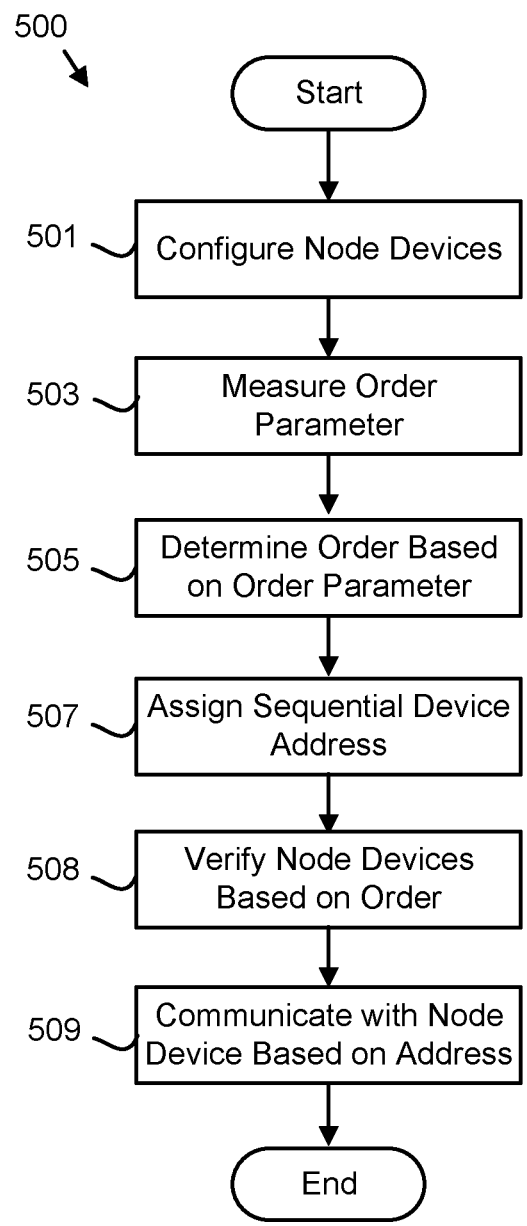
FIG. 5A is a schematic flow chart diagram of a device addressing method according to an embodiment.

FIG. 5A is a schematic flow chart diagram of a device addressing method 500. The method 500 may generate the order parameter 203 and the order number 207 for each node device 103. In addition, the method 500 may generate the device address 205 for each node device 103. The method 500 may be performed by the controller 303 and/or processor 405 of the master device 101 and/or node devices 103.

The method 500 starts, and in one embodiment, the processor 405 configures 501 each node device 103 on the serial network 100 for an order measurement. Configuring 501 each of the node devices 103 may comprise applying a specified current to the data lines 115 with the current source 305 and directing each node device 103 to report the node voltage as the order parameter 203 and a node device identifier 201. Determining the order number 207 using the node voltage is described in more detail in FIG. 5C.

Alternatively, configuring 501 each of node devices 103 comprises iteratively directing one of the node devices 103 to create a low impedance across data lines 115 of the serial network 100 with the low impedance circuit 311 and directing all other of the node devices 103 to create a high impedance across the data lines 115 with the low impedance circuit 311. Determining the order number 207 using the time-of-flight 363 is described in more detail in FIG. 5B.

The processor 405 further measures 503 the order parameter 203. Measuring the order parameter 203 may include receiving the node voltage as the order parameter 203 and receiving the node device identifier 201. Alternatively, measuring the order parameter 203 includes transmitting the pulse 361*a* over the data lines 115 from the pulse circuit 309, receiving an answering pulse 361*b* at the pulse circuit 309, and measuring the order parameter 203 as a time of flight 363 for the answering pulse 361*b* over the data lines 115 from transmitting the pulse to receiving the answering pulse 361*b*.

The processor 405 may determine 505 the order number 207 of each of the node devices 103 based on the order parameter 203 for the node device 103. In one embodiment, the order parameter 203 is the node voltage. The processor 405 may determine 505 the order number 207 by ranking the node voltages from highest to lowest node voltage. Table 3 illustrates one embodiment of determining 505 the order number 207 based on node voltages.

TABLE 3

| Node Voltage | Order Number 207 |
|---|---|
| 4.5 V | 1 |
| 3.5 V | 2 |
| 2.5 V | 3 |
| 1.5 V | 4 |

In an alternative embodiment, the processor 405 determines 505 the order number 207 by ranking the time-of-flight 363 for each node device 103 from shortest to longest time-of-flight 363. Table 4 illustrates one embodiment of determining 505 the order number 207 based on the time-of-flight 363 as measured in microseconds (μs).

TABLE 4

| Time-of-Flight 363 | Order Number 207 |
|---|---|
| 0.4 μs | 1 |
| 0.7 μs | 2 |
| 1.1 μs | 3 |
| 1.4 μs | 4 |

In one embodiment, the processor 405 assigns 507 a serial network unique and/or sequential device address 205 to each of the plurality of node devices 103 based on the order number 207 of the node device 103. For example, the master device 101 may be assigned a first device address 205 and each subsequent node device 103 the assigned a serial network unique and/or sequential device address 205 based on the first device address 205. Table 5 illustrates one embodiment of assigning 507 serial network unique and/or sequential device addresses 205.

TABLE 5

| Order Number 207 | Device Address 205 |
|---|---|
| Master Device 101 | 192.168.1.0 |
| 1 | 192.168.1.1 |
| 2 | 192.168.1.2 |
| 3 | 192.168.1.3 |
| 4 | 192.168.1.4 |

In one embodiment, a node device 103 is configured based on the order number 207. In addition, the node device 103 may be configured based on the node device identifier 201. In a certain embodiment, the node device 103 is configured based on a function of the node device.

The processor 405 may verify 508 at least one node device 103 based on the order number 207 for the node device 103. For example, the processor 405 may verify 508 that a correct node device 103 is at a location in the network cable 105 as indicated by the order number 207. In addition, the processor 405 may verify 508 a firmware version and/or manufacturer for at least one node device 103.

In one embodiment, the processor 405 further communicates 509 with one or more node devices 103 based on the device addresses 205 and the method 500 ends. For example, continuing the example of Table 5, the processor 405 may communicate 509 with the node device 103 at IP address 192.168.1.2.

Figure 5B:
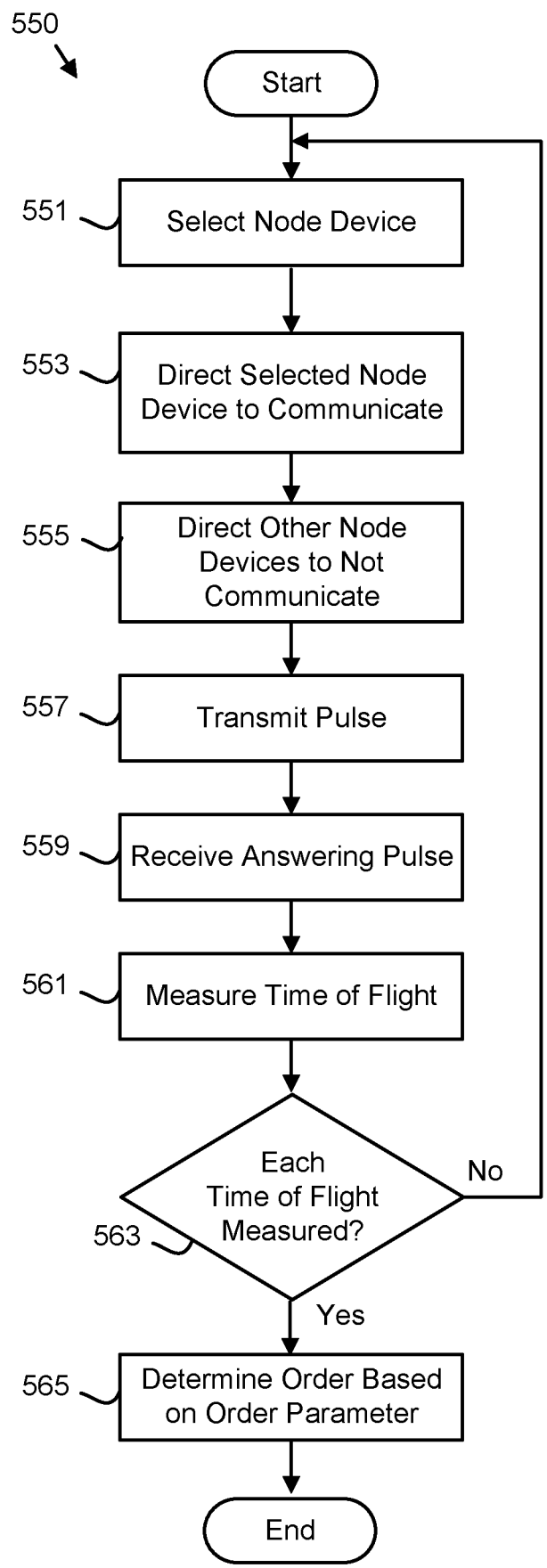
FIG. 5B is a schematic flow chart diagram of a time-of-flight order determination method according to an embodiment.

FIG. 5B is a schematic flow chart diagram of a time-of-flight order determination method 550. The method 550 may generate the order parameter 203 and the order number 207 for each node device 103. The method 550 may be performed by the controller 303 and/or processor 405 of the master device 101 and/or node devices 103.

The method 550 starts, and in one embodiment, the processor 405 selects 551 one and only one node device 103 of the plurality of node devices 103. The processor 405 may iteratively select 551 each node device 103 in turn. In one embodiment, the node devices 103 are selected based on the node device identifier 201.

The processor 405 further directs 553 the selected node device 103 to communicate the answering pulse 361*b*. The processor 405 may direct 553 the selected node device 103 of FIG. 3D to create a low impedance across data lines 115 to communicate the answering pulse 361*b*. In one embodiment, the processor 405 asserts the low impedance command 349 at the selected node device 103. Asserting the low impedance command 349 may direct the low impedance circuit 311 to short the data lines 115. Alternatively, asserting the low impedance command 349 may direct the low impedance circuit 311 to lower the impedance between the data lines 115.

In one embodiment, the processor 405 directs 553 the selected node device 103 to generate a response pulse to communicate the answering pulse 361*b*. For example, in response to the selection, the processor 405 of the selected node device 103 of FIG. 3G may receive the time-of-flight 363 from the timer 362 indicating that the pulse 361*a* was received. The processor 405 of the selected node device 103 may assert the pulse command 353 to generate the response pulse answering pulse 361*b*.

The processor 405 further directs 555 all other of the node devices 103 not communicate the answering pulse 361*b*. The processor 405 may direct 555 the all other of the node devices 103 of FIG. 3D to create a high impedance across the data lines 115. In one embodiment, the processors 405 of the all other node devices 103 de-assert the low impedance command 349. De-asserting the low impedance command 349 may direct the low impedance circuit 311 to maintain the impedance between the data lines 115.

Alternatively, the processor 405 may direct 555 all other node devices of FIG. 3G to not generate the answering pulse 361b.

The processor 405 further transmits 557 the pulse 361a over the data lines 115. In one embodiment, the processor 405 issues the pulse command 353. In response to the pulse command 353, the pulse circuit 309 may generate the pulse 361a. In one embodiment, the pulse 361a is slowed by at least one node component 307. The pulse 361a is reflected by the low impedance circuit 311 of the selected node device 103 as the answering pulse 361b. Alternatively, the answering pulse 361b is generated by the pulse circuit 309 of the selected node device 103 as a response pulse. The pulse circuit 309 receives 559 the answering pulse 361b and measures 561 the time-of-flight 363 for the answering pulse 361b. The pulse circuit 309 may communicate the time-of-flight 363 to the processor 405 of the master device 101 as the order parameter 203. The time-of-flight 363 may be communicated in a standard format.

The processor 405 determines 563 if the time-of-flight 363 for each node device 103 is measured. If all time-of-flights 363 are not measured, the processor 405 selects 551 a new device node 103. If all time-of-flights 363 are measured, the processor 405 determines 565 the order number 207 based on the order parameter 203 and the method 550 ends. For example, the order number 207 may be determined 565 as shown in Table 4.

Figure 5C:
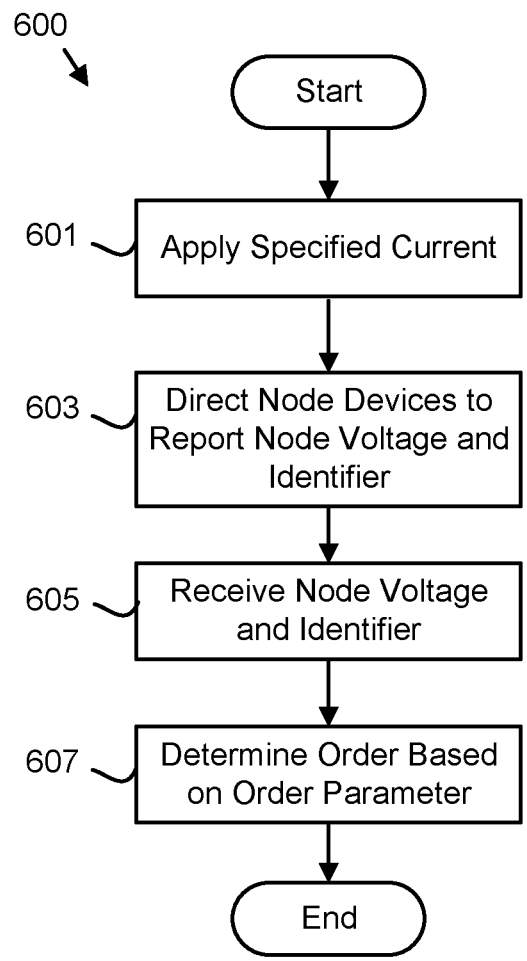
FIG. 5C is a schematic flow chart diagram of a node voltage order determination method according to an embodiment.

FIG. 5C is a schematic flow chart diagram of a node voltage order determination method 600. The method 600 may generate the order parameter 203 and the order number 207 for each node device 103. The method 600 may be performed by the controller 303 and/or processor 405 of the master device 101 and/or node devices 103.

The method 600 starts, and in one embodiment, the processor 405 applies 601 a specified current to the data lines 115. The processor 405 may assert the voltage command 323. Asserting the voltage command 323 may activate the current generator 319.

The processor 405 may further direct 603 each node device 103 to report a node voltage and a node device identifier 201. In one embodiment, the processor 405 directs 603 each node device 103 to go silent and not communicate with the data lines 115. The processor 405 may use the node device identifier 201 to direct 603 a specified node device 103 to measure the node voltage with the voltage circuit 313. The processor 405 may further direct 603 each node device 103 to measure the node voltage after a specified quiet time interval.

The voltage circuit 313 may communicate the voltage signal 327 to the processor 405 of the node device 103. The controller 303 of the node device 103 may convert the voltage signal 327 to the node voltage and communicate the node voltage to the processor 405 of the master device 101 as the order parameter 203.

In one embodiment, the processor 405 iteratively directs 603 each node device 103 to report the node voltage. Alternatively, the processor 405 directs 603 all node devices 103 to report the node voltage. The node devices 103 may report the node voltage along with the node device identifier 201 for each node device 103.

The processor 405 receives 605 the node voltage as the order parameter 203. In addition, the processor 405 may receive 605 the node device identifier 201. The order parameter 203 and/or node device identifier 201 may be received in a standard format.

The processor 405 determines 607 the order number 207 based on the order parameter 203 and the method 600 ends. The order number 207 may be determined 607 as shown in Table 3.

Problem/Solution

Node devices 103 are added to the network cable 105 of the serial network 100 to provide communications to the node devices 103. While each node device 103 may be logically identified and addressed based on the node device identifier 201, the physical order of node devices 103 on the network cable 105 may be unknown. The embodiments configure each node device 103 on the serial network 100 for an order measurement. The embodiments further measure the order parameter 203 for each of the node devices 103. The embodiments determine the order number 207 for each of the node devices 103 based on the order parameter 203 for the node device 103. The embodiments assign a serial network unique and/or sequential device address 205 to each of the node devices 103 based on the order number 207 of the node device 103. As a result, the physical order of the node devices 103 may be identified based on the device address 205. Thus, a node device 103 may be physical identified and/or located on the network cable 105.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus comprising:
a processor;
a memory storing code executable by the processor to perform:
configuring each node device on a serial network for an order measurement, wherein the serial network comprises two data lines that carry data between all node devices, each of the node devices comprises a pulse circuit connected between the data lines that detects an electrical pulse generated by a pulse circuit of a master device and generates an answering pulse with a voltage generator, and configuring the node devices comprises iteratively configuring one given node device to detect the pulse and generate the answering pulse and configuring all other node devices to not detect the pulse and not generate the answering pulse;
transmitting the electrical pulse over the data lines of the serial network from the master device, the data lines comprising node components that increase an electrical time-of-flight measured between node devices;
receiving an answering pulse that is generated by the voltage generator of the given node device in response to detecting the electrical pulse;
measuring an electrical time-of-flight time interval from transmitting the electrical pulse to receiving the answering pulse as an order parameter for each of the node devices;
ranking the electrical time-of-flight time intervals for each node device from shortest to longest; and determining an order number of each of the node devices based on the electrical time-of-flight time interval ranking for the node device.

2. The apparatus of claim 1, the processor further assigning a serial network unique device address to each of the node devices based on the order number of the node device.

3. The apparatus of claim 2, the processor further communicating with a node device based on the device address.

4. The apparatus of claim 1, wherein each pulse circuit comprises a pulse generator that generates the electrical pulse in response to a pulse command, a timer, and an op amp that compares a voltage between the data lines to a voltage threshold.

5. The apparatus of claim 4, wherein the pulse command starts the timer and the voltage of the data lines exceeding the voltage threshold stops the timer to measure electrical time-of-flight time interval of the answering pulse.

6. The apparatus of claim 1, the serial network further comprising two switched power lines and two network power lines.

7. The apparatus of claim 6, wherein the two data lines, the two switched power lines, and the two network power lines are enclosed in a ribbon cable.

8. A method comprising:
configuring, by use of a processor, each node device on a serial network for an order measurement, wherein the serial network comprises two data lines that carry data between all node devices, each of the node devices comprises a pulse circuit connected between the data lines that detects an electrical pulse generated by a pulse circuit of a master device and generates an answering pulse with a voltage generator, and configuring the node devices comprises iteratively configuring one given node device to detect the pulse and generate the answering pulse and configuring all other node devices to not detect the pulse and not generate the answering pulse;
transmitting the electrical pulse over the data lines of the serial network from the master device, the data lines comprising node components that increase an electrical time-of-flight measured between node devices;
receiving an answering pulse that is generated by the voltage generator of the given node device in response to detecting the electrical pulse;
measuring an electrical time-of-flight time interval from transmitting the electrical pulse to receiving the answering pulse as an order parameter for each of the node devices;
ranking the electrical time-of-flight time intervals for each node device from shortest to longest; and
determining an order number of each of the node devices based on the electrical time-of-flight time interval ranking for the node device.

9. The method of claim 8, the method further assigning a serial network unique device address to each of the node devices based on the order number of the node device.

10. The method of claim 9, the method further communicating with a node device based on the device address.

11. The method of claim 8, wherein each pulse circuit comprises a pulse generator that generates the electrical pulse in response to a pulse command, a timer, and an op amp that compares a voltage between the data lines to a voltage threshold.

12. The method of claim 11, wherein the pulse command starts the timer and the voltage of the data lines exceeding the voltage threshold stops the timer to measure electrical time-of-flight time interval of the answering pulse.

13. The method of claim 8, the serial network further comprising two switched power lines and two network power lines.

14. The method of claim 13, wherein the two data lines, the two switched power lines, and the two network power lines are enclosed in a ribbon cable.

15. A computer program product comprising a non-transitory computer readable storage medium having code embodied therein, the code readable/executable by a processor to perform:
configuring each node device on a serial network for an order measurement, wherein the serial network comprises two data lines that carry data between all node devices, each of the node devices comprises a pulse circuit connected between the data lines that detects an electrical pulse generated by a pulse circuit of a master device and generates an answering pulse with a voltage generator, and configuring the node devices comprises iteratively configuring one given node device to detect the pulse and generate the answering pulse and configuring all other node devices to not detect the pulse and not generate the answering pulse;
transmitting the electrical pulse over the data lines of the serial network from the master device, the data lines comprising node components that increase an electrical time-of-flight measured between node devices;
receiving an answering pulse that is generated by the voltage generator of the given node device in response to detecting the electrical pulse;
measuring an electrical time-of-flight time interval from transmitting the electrical pulse to receiving the answering pulse as an order parameter for each of the node devices;
ranking the electrical time-of-flight time intervals for each node device from shortest to longest; and
determining an order number of each of the node devices based on the electrical time-of-flight time interval ranking for the node device.

16. The computer program product of claim 15, the processor further assigning a serial network unique device address to each of the node devices based on the order number of the node device.

17. The computer program product of claim 16, the processor further communicating with a node device based on the device address.

18. The computer program product of claim 15, wherein each pulse circuit comprises a pulse generator that generates the electrical pulse in response to a pulse command, a timer, and an op amp that compares a voltage between the data lines to a voltage threshold.

19. The computer program product of claim 18, wherein the pulse command starts the timer and the voltage of the data lines exceeding the voltage threshold stops the timer to measure electrical time-of-flight time interval of the answering pulse.

20. The computer program product of claim 15, the serial network further comprising two switched power lines and two network power lines.

* * * * *